United States Patent
Sakimura et al.

(10) Patent No.: US 10,066,074 B2
(45) Date of Patent: Sep. 4, 2018

(54) METHOD OF PRODUCING HOLLOW PARTICULATE MATERIAL

(71) Applicant: Konica Minolta, Inc., Tokyo (JP)

(72) Inventors: Tomoo Sakimura, Hino (JP); Shingo Fujimoto, Fussa (JP); Kunihiro Ogura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/993,247

(22) Filed: Jan. 12, 2016

(65) Prior Publication Data

US 2016/0208071 A1  Jul. 21, 2016

(30) Foreign Application Priority Data

Jan. 20, 2015  (JP) .................................. 2015-008486

(51) Int. Cl.
*C08J 9/30* (2006.01)
*B01J 13/18* (2006.01)

(52) U.S. Cl.
CPC  *C08J 9/30* (2013.01); *B01J 13/18* (2013.01)

(58) Field of Classification Search
None
See application file for complete search history.

(56) References Cited

U.S. PATENT DOCUMENTS

| 2012/0053250 A1* | 3/2012 | Carrick ................ A61K 9/5036 514/781 |
| 2014/0202696 A1* | 7/2014 | Hong .................... C08F 257/02 166/280.2 |

FOREIGN PATENT DOCUMENTS

| CN | 103421253 | * 12/2013 |
| JP | S62-127336 A | 6/1987 |
| JP | H01-278541 A | 11/1988 |
| JP | 2007021315 A | 2/2007 |
| JP | 2007196223 A | 8/2007 |
| JP | 2008-058950 A | 3/2008 |
| JP | 2012-517337 A | 8/2012 |
| JP | 2011245452 B2 | 1/2014 |

OTHER PUBLICATIONS

Chang et al, Preparation method of polystyrene hollow microballs and applications thereof, English Translation of CN103421253A, Dec. 4, 2013.*

Notification of Reasons for Refusal dated Mar. 28, 2017 from corresponding Japanese Application No. JP 2015-008486 and English translation; Total of 9 pages.

* cited by examiner

*Primary Examiner* — Jeffrey D Washville
(74) *Attorney, Agent, or Firm* — Lucas & Mercanti, LLP

(57) ABSTRACT

A method of producing, in a liquid, a hollow particulate material having a cavity therein, the method including: (A) blowing gas into a resin solution containing a first dispersion medium; (B) pouring the resin solution to which the gas is blown in step (A) into a second dispersion medium to form liquid droplets encapsulating the gas and prepare a dispersion of the liquid droplets; and (C) solidifying the liquid droplets formed in step (B) and isolating the solidified liquid droplets from the second dispersion medium.

9 Claims, 1 Drawing Sheet

METHOD OF PRODUCING HOLLOW PARTICULATE MATERIAL

BACKGROUND OF THE INVENTION

1. Field of the Invention

The present invention relates to a method of producing a hollow particulate material. In particular, the present invention relates to a method of producing hollow particulate materials having varieties of compositions and structures through simplified steps.

2. Description of Related Art

Hollow particulate materials have been developed and placed on the market as functional materials that are lightweight, have heat insulating properties, and can scatter light. Unfortunately, traditional methods of producing hollow particulate materials are complicated. For example, seed particles are prepared and then polymerized; water-in-oil (W/O) emulsion is prepared and then converted into water-in-oil-in water (W/O/W) composite emulsion; and/or thermally expandable microcapsules having thermoplastic polymer sheathes containing low-boiling-point liquid therein are prepared and then thermally expanded.

Aside from these techniques, inventions have been made which are directed to simplified production of hollow particulate materials using gas as a template. For example, Japanese Patent Application Unexamined Publication No. 2011-245452 discloses a technique involving polymerization of gasified polymerizable monomer at the interface between the gas phase and the liquid phase; Japanese Patent Application Unexamined Publication No. 2007-21315 discloses a technique involving polymerization of a substance at the surfaces of bubbles in liquid; and Japanese Patent Application Unexamined Publication No. 2007-196223 discloses a technique involving acceleration of polymerization of a substance in a liquid phase with a catalyst in a gas phase.

Since precursors of the hollow particulate materials are formed after formation of bubbles having unstable structures in these techniques, hollow particulate materials cannot be produced stably. In addition, a vaporizable and polymerizable monomer is essential for the technique disclosed in Japanese Patent Application Unexamined Publication No. 2011-245452; a polymerizable substance that can selectively adsorb on the surfaces of bubbles is essential for in Japanese Patent Application Unexamined Publication No. 2007-21315; and a vaporizable catalyst is essential for in Japanese Patent Application Unexamined Publication No. 2007-196223. As a result, very limited substances can be used for production of hollow particulate materials.

SUMMARY OF THE INVENTION

An object of the present invention, which has been accomplished to solve the problems or disadvantages, is to provide a method of producing hollow particulate materials having varieties of composition and structure by simplified steps.

The present inventors have found that a dispersion of liquid droplets of a resin encapsulating gas can be produced by Step (A) blowing the gas into a resin solution containing a first dispersion medium, and Step (B) pouring the resin solution containing the gas after Step (A) into a second dispersion medium to form a dispersion of liquid droplets encapsulating the gas through investigation on factors causing the problems and has solved the problems.

The inventors have also found that hollow particulate materials having varieties of composition and structure can be prepared by simplified steps, that is, by solidifying the liquid droplets prepared in Step (B) to form solid particles and then isolating the solid particles from the second dispersion medium in Step (C), and has accomplished the invention.

The problems described above can be solved by the following aspects in accordance with the present invention:

1. A method of producing, in a liquid, a hollow particulate material having a cavity therein, the method including: (A) blowing gas into a resin solution containing a first dispersion medium; (B) pouring the resin solution to which the gas is blown in step (A) into a second dispersion medium to form liquid droplets encapsulating the gas and prepare a dispersion of the liquid droplets; and (C) solidifying the liquid droplets formed in step (B) and isolating the solidified liquid droplets from the second dispersion medium.

2. The method according to the aspect 1, wherein the first dispersion medium includes an organic solvent or a polymerizable monomer.

3. The method according to the aspect 1, wherein the resin solution contains a lipophilic surfactant.

4. The method according to the aspect 1, wherein the second dispersion medium includes an aqueous solvent.

5. The method according to the aspect 1, wherein the dispersion of the liquid droplets contains an aqueous surfactant.

6. The method according to the aspect 1, wherein the resin solution has a viscosity of 10 mPa·s or more at 25° C.

7. The method according to the aspect 1, wherein the liquid droplets are solidified through removal of the first dispersion medium.

8. The method according to the aspect 1, wherein the liquid droplets are solidified through polymerization of the liquid droplets.

9. The method according to the aspect 1 further including, between steps (B) and (C), a step of dividing the liquid droplets encapsulating the gas.

The present invention provides a method of producing hollow particulate materials having varieties of composition and structure by simplified steps.

The inventors estimate the mechanism or scheme on the advantageous effects and action in the present invention as described below, although it is not completely clear.

The inventors have studied on direct formation of liquid droplets encapsulating gas as a precursor of a hollow particulate material to solve the problems described above.

The inventors have found that when the resin solution containing bubbles prepared by blow of gas into the resin solution in Step (A) is poured into the second dispersion medium, a dispersion of resin liquid droplets encapsulating gas that are a precursor of hollow particles can be formed in Step (B).

The inventors have also found that a simple process involving solidification of the liquid droplets encapsulating gas in the dispersion medium and isolation of the resulting particles from the second dispersion medium (Step (C)) can produce hollow particulate materials having varieties of composition and structure, which differs from complicated traditional methods of producing hollow particulate materials, and has completed the present invention.

BRIEF DESCRIPTION OF THE DRAWINGS

The above and other objects, advantages and features of the present invention will become more fully understood from the detailed description given hereinbelow and the appended drawings which are given byway of illustration

DETAILED DESCRIPTION OF THE PREFERRED EMBODIMENT

Figure 1:
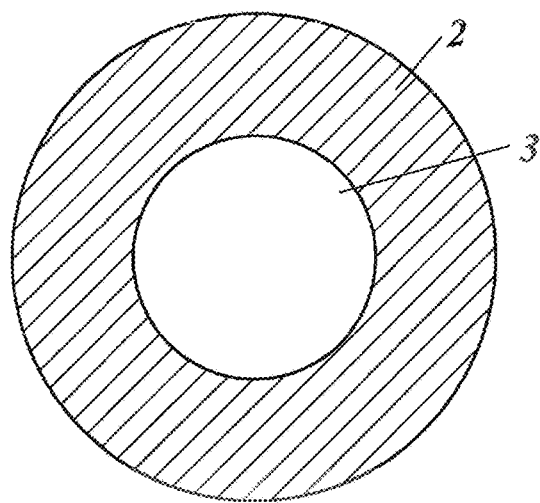
FIG. 1 is a schematic illustration of an example hollow particulate material produced by a method according to the present invention.

The method of producing a hollow particulate material having a cavity therein in a liquid in accordance with the present invention includes (A) blowing gas into a resin solution containing a first dispersion medium; (B) pouring the resin solution containing the gas after Step (A) into a second dispersion medium to form a dispersion of liquid droplets encapsulating the gas; and (C) solidifying the liquid droplets prepared in Step (B) to form particles and isolating the particles from the second dispersion medium. This method is a feature of the present invention.

In a preferred embodiment of the present invention, the first dispersion medium includes an organic solvent or a polymerizable monomer. Use of such a first dispersion medium facilitates preparation of a resin solution under an ordinal environment (normal pressure and normal temperature), resulting in low cost and high safety.

In a preferred embodiment of the present invention, the resin solution contains a lipophilic surfactant. The lipophilic surfactant can improve the yield of the hollow particulate material.

In a preferred embodiment of the present invention, the second dispersion medium includes an aqueous solvent. The aqueous solvent can improve the yield of the hollow particulate material.

In a preferred embodiment of the present invention, the dispersion of liquid droplets contains an aqueous surfactant. The aqueous surfactant can improve the yield of the hollow particulate material.

In a preferred embodiment of the present invention, the resin solution has a viscosity of 10 mPa·s or more at 25° C. The resin solution having such a viscosity can improve the yield of the hollow particulate material.

In a preferred embodiment of the present invention, the liquid droplets are solidified through removal of the first dispersion medium to ensure the advantageous effects of the present invention.

In a preferred embodiment of the present invention, the liquid droplets are solidified through polymerization of the liquid droplets to ensure the advantageous effects of the present invention.

In a preferred embodiment of the present invention, the method further includes, between steps (B) and (C), a step of dividing the liquid droplets encapsulating the gas. The additional step facilitates formation of a fine hollow particulate material.

The embodiments of present invention will now be described in detail. Throughout the specification, symbol "-" or term "to" between two numeric values indicates numerical ranges inclusive of the upper and lower limits.

<<Outline of Method of Producing Hollow Particulate Material>>

The method of producing, in a liquid, a hollow particulate material having a cavity therein in accordance with the present invention includes (A) blowing gas into a resin solution containing a first dispersion medium; (B) pouring the resin solution containing the gas after Step (A) into a second dispersion medium to form a dispersion of liquid droplets encapsulating the gas; and (C) solidifying the liquid droplets prepared in Step (B) to form particles and isolating the particles from the second dispersion media.

FIG. 1 is a schematic illustration of an example hollow particulate material produced by a method according to the present invention.

In the example illustrated in FIG. 1, the hollow particulate material 1 has a cavity 3 therein. The cavity may be filled with gas, such as air, or may be vacuum. The outer portion surrounding the cavity in the hollow particulate material 1 is also referred to as an outer envelope (a shell 2).

Steps (A) to (C) of the method of producing hollow particulate material will now be described in detail.

[Step (A)]

In Step (A), gas is blown into a resin solution containing a first dispersion medium.

<Blowing of Gas>

Gas may be blown by any method suitable for preparation of liquid droplets encapsulating gas (bubbles of resin solution), for example, by blowing air with a bubbler (filter available from AZONE Corporation). Alternatively, liquid droplets encapsulating gas (bubbles of resin solution) may be prepared through bubbling by agitation of a resin solution.

<Resin Solution>

The resin solution is a solution of a resin dissolved in a solvent or a liquefied resin. Among them, a resin solution containing a first dispersion media is preferred which can be readily prepared under an ordinal environment (normal pressure and normal temperature). Preferred resins are soluble in the first dispersant because a resin solution can be readily and safely prepared at low cost under an ordinal environment (normal pressure and normal temperature).

The resin solution should preferably further contain a lipophilic surfactant to maintain the state of the resin solution containing gas, and thus to reduce solid particles generated from liquid droplets not encapsulating gas. As a result, the hollow particulate material can be produced at high yield.

The resin solution should preferably have a viscosity of 10 mPa·s or more at 25° C. to maintain the state of the resin solution containing gas, and thus to increase the yield of the hollow particulate material. The viscosity should more preferably be 100 mPa·s or more.

The upper limit of the viscosity at 25° C. of the resin solution depends on the specification on the upper limit of the viscosity of the bubbling device. The viscosity should preferably be five hundred-thousand mPa·s or less, more preferably 75000 mPa·s or less in general-purpose agitators.

(Viscometry)

The viscosity may be determined by any known method, preferably with a rotational viscometer, for example, of a coaxial double cylinder type, a single cylindrical type (Model B), or a cone and plate type (Model E). In examples (described below) of the present invention, the viscosity was measured with a cone and plate viscometer.

(Resin)

The resin solution of the present invention may contain any resin that can be liquefied, for example, by being dissolved in the first dispersion medium, such as an organic solvent or polymerizable monomer. Such resins are polymers commercially available or prepared as needed. Examples of such resins include polystyrene, cycloolefin polymers, polyolefins, polycarbonates, acrylic resins, epoxy resins, vinyl chloride resins, and polyamides.

The resin contained in the resin solution may be a polymer prepared by polymerization of part of polymerizable monomer that is a raw material for the resin before gas is blown.
(Lipophilic Surfactant)

A surfactant molecule consists of a combination of a hydrophilic group and a lipophilic group. Many types of surfactants have been produced by combination of varieties of hydrophilic groups and lipophilic groups. In the present invention, any lipophilic surfactant may be suitably used without restriction that can be dissolved in organic solvents or polymerizable monomers and can ensure stable dispersion of gas.

The resin solution containing such a lipophilic surfactant facilitates stable dispersion of gas in the organic solvent or polymerizable monomer and thus formation of liquid droplets encapsulating gas, resulting in production of a reduced amount of solid particles derived from droplets not encapsulating gas and thus production of a hollow particulate material at an increased yield.

Examples of preferred lipophilic surfactant include anionic surfactants and nonionic surfactants.

Examples of anionic surfactants include sulfonates, such as sodium dodecylbenzene sulfonate, sodium aryl alkyl polyether sulfonate, 3,3-disulfone diphenyl urea-4,4-diazo-bis-amino-8-naphthol-6-sulfonic acid sodium salt, ortho-carboxybenzene-azo-dimethylaniline, and 2,2,5,5-tetram-ethyl-triphenylmethane-4,4-diazo-bis-β-naphthol-6-
sulfonic acid sodium salt; sulfate ester salts, such as sodium dodecyl sulfate, sodium tetradecyl sulfate, sodium pentadecyl sulfate, sodium octyl sulfate, and sodium lauryl sulfate; and fatty acid salts, such as sodium oleate, sodium laurate, sodium caprate, sodium caprylate, sodium caproate, potassium stearate, and calcium oleate.

Examples of nonionic surfactant include poly(ethylene oxide), poly(propylene oxide), combinations of poly(propylene oxide) and poly(ethylene oxide), esters of poly(ethylene glycol) and higher fatty acids, alkylphenol poly(ethylene oxide), esters of higher fatty acids and poly(ethylene glycol), esters of higher fatty acids and poly(propylene oxide), and sorbitan esters.

These surfactants may be used alone or in combination.

The surfactant may be replaced with any one of vinyl polymers, such as poly(vinyl alcohol), polyvinylpyrrolidone, and homopolymers and copolymers alkyl (meth)acrylate esters, which can stabilize dispersion.

Examples of commercially available surfactant include Rheodol SP-L10 made by Kao Corporation and Modiper F606 made by NOF Corporation.
<First Dispersion Medium>

Any first dispersion medium can be used which can liquefy the resin by, for example, dissolution. Preferred dispersion media are organic solvents and polymerizable monomers.
(Organic Solvent)

In the present invention, any organic solvent can be used which can be dispersed in water after the resin is dissolved. Examples of such organic solvent include toluene, cyclohexane, cyclohexanone, 2-butanone, tetrahydrofuran, ethyl acetate, and methylene chloride.
(Polymerizable Monomer)

Any polymerizable monomer dispersible in water after the resin is dissolved can be used without restriction. Examples include those contained in the following lists (1) to (8).
(1) Styrenic Monomers Examples of styrenic monomers include styrene, o-methylstyrene, m-methylstyrene, p-methylstyrene, α-methylstyrene, p-phenylstyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, and 2,4-dimethylstyrene.
(2) (Meth)Acrylate Ester Mononers Examples of (meth)acrylate ester monomers include methyl acrylate, ethyl acrylate, n-propyl acrylate, isopropyl acrylate, n-butyl acrylate, isobutyl acrylate, t-butyl acrylate, n-octylacrylate, 2-ethylhexyl acrylate, stearyl acrylate, lauryl acrylate, phenyl acrylate, methyl methacrylate, ethyl methacrylate, n-propyl methacrylate, isopropyl methacrylate, n-butyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate.
(3) Olefins Examples of olefins include ethylene, propylene, and isobutylene.
(4) Vinyl Esters Examples of vinyl esters include vinyl propionate, vinyl acetate, and vinyl benzoate.
(5) Vinyl Ethers Examples of vinyl ethers include vinyl methyl ether and vinyl ethyl ether.
(6) Vinyl Ketones Examples of vinyl ketones include vinyl methyl ketone, vinyl ethyl ketone, and vinyl hexyl ketone.
(7) N-Vinyl Compounds Examples of N-vinyl compounds include N-vinylcarbazol, N-vinylindole, and N-vinylpyrrolidone.
(8) Polyfunctional Vinyl Monomers Examples of polyfunctional vinyl monomer include divinylbenzene, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycoldiacrylate, hexylene glycol dimethacrylate, hexylene glycol diacrylate, and dimethacrylates and trimethacrylates of trivalent or higher valent alcohols, such as pentaerythritol and trimethylolpropane.
(9) Others Examples of other monomers include butadiene, vinyl compounds, such as vinylnaphthalene and vinylpyridine, acrylic and methacrylic derivatives, such as acrylonitrile, methacrylonitrile, acrylamide, and methacrylamide, and maleic anhydride.
<Blowable Gas>

The blowable gas should be in a gaseous state during Steps (A) to (C). Examples of such gas include air and inert gases, such as helium, argon, nitrogen, and carbon dioxide in view of stability and safety.
[Step (B)]

Step (B) involves pouring of the resin solution containing gas prepared in Step (A) into a second dispersion medium to prepare dispersion of liquid droplets encapsulating the gas.

The dispersion of liquid droplets should preferably contain an aqueous surfactant to prevent coagulation of the liquid droplets and thus to improve the yield of the hollow particulate material.
(Liquid Droplets)

The liquid droplets in accordance with the present invention refer to particles of resin solution formed in the second dispersion medium. The liquid droplets can be dispersed in the second dispersion medium in the form of gas-encapsulating shells of resin solution (shells having cavities).

(Aqueous Surfactant)

As described above, a surfactant consists of a combination of a hydrophilic group and a lipophilic group. Many types of surfactants have been produced by combination of varieties of hydrophilic groups and lipophilic groups. In the present invention, any aqueous surfactant may be suitably used without restriction that can be dissolved in aqueous solvents and can ensure stable dispersion of liquid droplets.

The dispersion of the liquid droplets encapsulating such an aqueous surfactant has enhanced dispersion stability, resulting in a high yield of hollow particulate material.

Preferred aqueous surfactants are anionic surfactants and nonionic surfactants.

Examples of anionic surfactant include sulfonates, such as sodium dodecylbenzene sulfonate, sodium poly(aryl alkyl ether) sulfonate, sodium 3,3-disulfonediphenylurea-4,4-di-azi-bis-amino8-naphthol-6-sulfonate, ortho-carboxybenzeneazo-dimethylaniline, and sodium 2,2,5,5-tetramethyltriphenylmethane-4,4-diazo-bis-β-naphthol-6-sulfonate; sulfate esters, such as sodium dodecyl sulfate, sodium tetradecyl suflate, sodium pentadecyl sulfate, and sodium octyl sulfate, and fatty acid salts, such as sodium oleate, sodium laurate, sodium caprate, sodium caprylate, sodium caproate, potassium stearate, and calcium oleate.

Examples of nonionic surfactant include poly(ethylene oxide), poly(propylene oxide), combinations of poly(propylene oxide) and poly(ethylene oxide), esters of poly(ethylene glycol) and higher fatty acids, alkylphenol poly(ethylene oxide), esters of higher fatty acids and poly(ethylene glycol), esters of higher fatty acids and poly(propylene oxide), and sorbitan esters.

These surfactants may be used alone or in combination.

The surfactant may be replaced with any one of vinyl polymers, such as poly(vinyl alcohol), polyvinylpyrrolidone, and homopolymers and copolymers alkyl(meth)acrylilate esters, which can stabilize dispersion.

<Second Dispersion Medium>

Any second dispersion medium can be used which can disperse the liquid droplets encapsulating gas. When the first dispersion medium is an organic solvent or polymerizable monomer, preferred second dispersion media are aqueous solvents which can prevent excess dissolution of the resin solution and thus can improve the yield of the hollow particulate material.

(Aqueous Solvent)

Water and any aqueous solvent can be used which is miscible with water in any ratio. Examples of aqueous solvent other than water include methanol, ethanol, and acetone. Among them particularly preferred is water, which is environmentally friendly, highly safe, and less soluble in the organic solvent or polymerizable monomers. Any type of water can be preferably used, for example, deionized water and distilled water.

[Step (C)]

In Step (C), the liquid droplets prepared in Step (B) are solidified and are separated from the second dispersion medium.

<Solidification>

Any method may be employed for solidification. For a solution of resin in a polymerizable monomer, the solidification may be performed by polymerization by heat or light. For a solution of resin in a nonpolymerizable organic solvent (first dispersion medium), the solidification may be achieved by removing the first dispersion medium through reduced pressure distillation or steam distillation.

(Polymerization of Liquid Droplets)

A typical initiator of polymerizing the liquid droplets is heating or light irradiation in the presence of a polymerization initiator. Gamma ray or electron beam irradiation is also effective means.

The polymerization initiators are roughly classified into water-soluble polymerization initiators and oil-soluble polymerization initiators on the basis of the solvents used (first dispersion medium and second dispersion medium).

Any water-soluble polymerization initiator may be used which can be polymerized at a temperature lower than the boiling point of the second dispersion medium and the polymerizable monomer used. Examples of such an initiator include persulfate salts, such as potassium persulfate, potassium peroxodisulfate, and ammonium persulfate; 2,2'-azobis (2-amidinopropane) acetate; azobiscyanovaleric acid and salts thereof; and hydrogen peroxide.

These water-soluble polymerization initiators may be used alone or in combination.

Any lipophilic polymerization initiator may be used which can be polymerized at a temperature lower than the boiling point of the medium and the polymerizable monomer used. Examples of such an initiator include azo and diazo initiators, such as 2,2'-azobis(2,4'-dimethylvaleronitrile), $\alpha,\alpha'$-azobisisobutyronitrile, 1,1'-azobis(cyclohexane-1-carbonitrile), and 2,2'-azobis4-methoxy-2,4-dimethylvaleronitrile; peroxide initiators, such as benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy)triazine; and polymeric initiators having peroxide side chains.

These lipophilic polymerization initiators may be used alone or in combination.

<Isolation>

The solidified liquid droplets may be isolated in any known manner. For example, the solidified liquid droplets are suction-filtered, and the residue is washed with deionized water and then was spread on a pad to be dried. Alternative processes include freeze dehydration after repeated operation of centrifugal separation and addition of deionized water or ultrafiltration accompanied by addition of deionized water.

A division step may be employed between steps (B) and (C) in order to divide the liquid droplets encapsulating gas. Such a step is preferred to form fine hollow particulate materials.

(Division)

Any division process may be employed. For example, the dispersion of the liquid droplets encapsulating gas is filtered through a membrane having fine pores to be further divided to collect finer liquid droplets encapsulating gas.

If the membrane has fine pores having a uniform size, the particle sizes of liquid droplets encapsulating gas can have a uniform size after division. An example of such a membrane is an SPG membrane made by SPG Technology Co., Ltd.

The above described embodiments should not be construed to limit the invention and can be appropriately modified within the scope of the gist of the present invention.

EXAMPLES

The present invention will now be described in detail by way of Examples, which should not be construed to limit the present invention. In Examples, "part(s)" and "%" refer to "part(s) by mass" and "% by mass", respectively, unless otherwise stated.

Example (1)

Polystyrene resin HP-555 available from DIC Corporation (3 parts) was dissolved in toluene (first dispersion medium) (12 parts). A lipophilic surfactant, Rheodol SP-L10 made by Kao Corporation (0.35 parts) was dissolved in the mixture to prepare a resin solution. The solution had a viscosity of 1056 mPa·s at 25° C.

Air was blown from a bubbler (filter available from AZONE Corporation) into the resin solution to prepare a resin solution containing bubbles (Step (A)).

The viscosity was measured at 25° C. with a viscometer VISCONIC ELD-R made by Tokyo Keiki Inc.

In the next stage, an aqueous surfactant, poly(vinyl alcohol) 500 (PVA in Table 1) (22.5 parts) made by Kanto Chemical Co., Inc. was dissolved in deionized water (second dispersion medium) (450 parts), and the resin solution containing bubbles was poured into the second dispersion medium solution while the second dispersion medium solution was being moderately stirred to prepare dispersion of liquid droplets encapsulating gas (white dispersion [1]) (Step (B)).

Hot steam was blown into white dispersion [1] to remove toluene by steam distillation and thus to solidify the liquid droplets to form particles. The particles were washed by suction filtration and with deionized water, were spread over a pad, and then were dried at 40° C. to prepare white powder [1] (Step (C)).

(Observation of Hollow Particulate Material)

Figure 2:
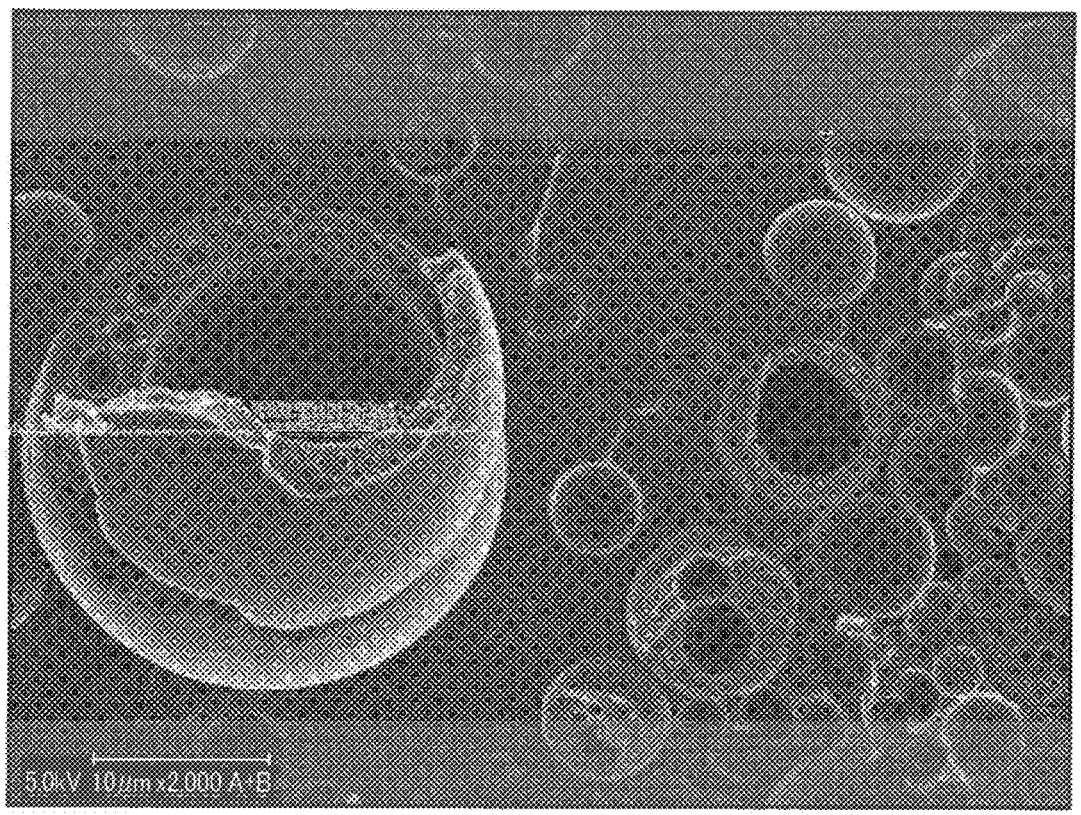
FIG. 2 is an example SEM photograph of a hollow particulate material produced by a method according to the present invention.

White powder [1] was embedded in a photo-curable resin D-800 (available from Jeol Ltd.). The resin was immersed in liquefied nitrogen to be fractured, and a fractured surface was observed with a scanning microscope (SEM). Spherical hollow particles consisting of dense surfaces or shells and internal cavities and having a particle size of about 5 to 100 µm were observed (See FIG. 2).

Example (2)

Cycloolefin polymer Zeonex 330R available from Zeon Corporation (3 parts) was dissolved in toluene (12 parts). A lipophilic surfactant, Modiper F606 made by NOF Corporation (0.35 parts) was dissolved in the mixture to prepare a resin solution. The solution had a viscosity of 960 mPa·s at 25° C.

Air was blown from a bubbler (filter available from AZONE Corporation) into the resin solution to prepare a resin solution containing bubbles (Step (A)).

An aqueous surfactant, sodium lauryl sulfate, Emal 2FG (22.5 parts) made by KANTO CHEMICAL CO., INC. was dissolved in deionized water (450 parts) to obtain a solution, and the resin solution containing bubbles was poured into the above solution while the solution was being moderately stirred to prepare dispersion of liquid droplets encapsulating gas (white dispersion [2]) (Step (B)).

Toluene was removed from white dispersion [2] through evaporation under reduced pressure, to solidify the liquid droplets to form particles.

The particles were washed by suction filtration and with deionized water, were spread over a pad, and then were dried at 40° C. to prepare white powder [2] (Step (C)).

White powder [2] was observed as in Example (1). Observed spherical hollow particles consisted of dense surfaces or shells and internal cavities and had a particle size of about 5 to 100 µm.

Example (3)

Polystyrene resin HP-555 available from DIC Corporation (3 parts) was dissolved in a polymerizable monomer, styrene monomer (first dispersion medium) available from Nihon Oxirane Co., Ltd. (12 parts). A lipophilic surfactant, Rheodol SP-L10 made by Kao Corporation (0.35 parts) and an oil-soluble initiator, α,α'-azobisisobutyronitrile (Kanto Chemical Co., Inc.) (0.183 parts) were dissolved in the mixture to prepare a resin solution. The solution had a viscosity of 936 mPa·s at 25° C.

Gaseous nitrogen was blown from a bubbler (filter available from AZONE Corporation) into the resin solution to prepare a resin solution containing bubbles (Step (A)).

An aqueous surfactant, poly(vinyl alcohol) 500 (22.5 parts) made by Kanto Chemical Co., Inc. was dissolved in deionized water (450 parts) to obtain a solution, and the resin solution containing bubbles was poured into the above solution while the solution was being moderately stirred to prepare dispersion of liquid droplets encapsulating gas (white dispersion [3]) (Step (B)).

White dispersion [3] was placed into a separable flask provided with a stirring device, a cooling water refluxing tube, and a nitrogen inlet tube, was stirred at room temperature for 20 minutes under a nitrogen stream, was heated to 70° C., was kept at 70° C. for 4 hours, was cooled to room temperature with stirring, and then was allowed to stand overnight (solidification by polymerization).

The resulting particles were washed by suction filtration and with deionized water, were spread over a pad, and then were dried at 40° C. to prepare white powder [3] (Step (C)).

White powder [3] was observed as in Example (1). Observed spherical hollow particles consisted of dense surfaces or shells and internal cavities and had a particle size of about 5 to 100 µm.

Example (4)

Polystyrene resin HP-555 available from DIC Corporation (3 parts) was dissolved in a mixture (first dispersion medium) of a styrene monomer available from Nihon Oxirane Co., Ltd. (11.3 parts) and neopentyl glycol dimethacrylate available from Shin-Nakamura Chemical Co., Ltd. (0.7 parts). A lipophilic surfactant, Rheodol SP-L10 made by Kao Corporation (0.35 parts) and an oil-soluble initiator, α,α'-azobisisobutyronitrile (Kanto Chemical Co., Inc.) (0.183 parts) were dissolved in the mixture to prepare a resin solution. The solution had a viscosity of 948 mPa·s at 25° C.

Gaseous nitrogen was blown from a bubbler (filter available from AZONE Corporation) into the resin solution to prepare a resin solution containing bubbles (Step (A)).

An aqueous surfactant, poly(vinyl alcohol) 500 (22.5 parts) made by Kanto Chemical Co., Inc. was dissolved in deionized water (450 parts) to obtain a solution, and the resin solution containing bubbles was poured into the above solution while the solution was being moderately stirred to prepare dispersion of liquid droplets encapsulating gas (white dispersion [4-1]) (Step (B)).

White dispersion [4-1] was passed through an SPG membrane having a pore size of 4.9 µm made by SPG Technology Co., Ltd. under a liquid pressure of 350 kPa to divide white dispersion [4-2] containing liquid droplets (division step of liquid droplets).

White dispersion [4-2] was placed into a separable flask provided with a stirring device, a cooling water refluxing tube, and a nitrogen inlet tube, was stirred at room temperature for 20 minutes under a nitrogen stream, was heated to 70° C., was kept at 70° C. for 4 hours, was cooled to room temperature with stirring, and then was allowed to stand overnight.

The resulting particles were washed by suction filtration and with deionized water, were spread over a pad, and then were dried at 40° C. to prepare white powder [4]. White powder [4] was observed as in Example (1). Observed spherical hollow particles consisted of shells and internal cavities and had a particle size of about 1 to 2 μm.

Example (5)

An oil-soluble polymerization initiator, α,α'-azobisisobutyronitrile (Kanto Chemical Co., Inc.) (0.183 parts) was dissolved in styrene monomer available from Nihon Oxirane Co., Ltd. (15 parts).

The solution was placed into a separable flask provided with a stirring device, a cooling water refluxing tube, and a nitrogen inlet tube, was stirred at room temperature for 20 minutes under a nitrogen stream, was heated to 55° C., was kept at 55° C. for 2 hours, and then was cooled to room temperature with stirring to polymerize part of the styrene monomer into a polymer.

A lipophilic surfactant, Rheodol SP-L10 made by Kao Corporation (0.35 parts) was dissolved in the solution to prepare a resin solution. The solution had a viscosity of 920 mPa·s at 25° C.

Gaseous nitrogen was blown from a bubbler (filter available from AZONE Corporation) into the resin solution to prepare a resin solution containing bubbles (Step (A)).

An aqueous surfactant, poly(vinyl alcohol) 500 (22.5 parts) made by Kanto Chemical Co., Inc. was dissolved in deionized water (450 parts) to obtain a solution, and the resin solution containing bubbles was poured into the above solution while the solution was being moderately stirred to prepare dispersion of liquid droplets encapsulating gas (white dispersion [5]) (Step (B)).

White dispersion [5] was placed into a separable flask provided with a stirring device, a cooling water refluxing tube, and a nitrogen inlet tube, was stirred at room temperature for 20 minutes under a nitrogen stream, was heated to 70° C., was kept at 70° C. for 4 hours, was cooled to room temperature with stirring, and then was allowed to stand overnight.

The resulting particles were washed by suction filtration and with deionized water, were spread over a pad, and then were dried at 40° C. to prepare white powder [5] (Step (C)).

White powder [5] was observed as in Example (1). Observed spherical hollow particles consisted of dense surfaces or shells and internal cavities and had a particle size of about 5 to 100 μm.

Comparative Example (1)

A surfactant, Rheodol SP-L10 made by Kao Corporation (0.35 parts) and an oil-soluble initiator, α,α'-azobisisobutyronitrile (Kanto Chemical Co., Inc.) (0.183 parts) were dissolved in a styrene monomer available from Nihon Oxirane Co., Ltd. (15 parts). The solution had a viscosity of 1 mPa·s at 25° C.

Gaseous nitrogen was blown from a bubbler (filter available from AZONE Corporation) into the resin solution to prepare a resin solution containing bubbles.

An aqueous surfactant, poly(vinyl alcohol) 500 (22.5 parts) made by Kanto Chemical Co., Inc. was dissolved in deionized water (450 parts) to obtain a solution, and the resin solution containing bubbles was poured into the above solution while the solution was being moderately stirred to prepare white dispersion [6-1].

White dispersion [6-1] was placed into a separable flask provided with a stirring device, a cooling water refluxing tube, and a nitrogen inlet tube, was stirred at room temperature for 20 minutes under a nitrogen stream, was heated to 70° C., was kept at 70° C. for 4 hours, was cooled to room temperature with stirring, and then was allowed to stand overnight.

The resulting particles were washed by suction filtration and with deionized water, were spread over a pad, and then were dried at 40° C. to prepare white powder [6]. White powder [6] was observed as in Example (1). Spherical particles not having internal cavities and having a particle size of about 5 to 100 μm were observed.

Comparative Example (2)

A mixture of a styrene monomer (first dispersion medium) available from Nihon Oxirane Co., Ltd. (14.3 parts) and neopentyl glycol dimethacrylate available from Shin-Nakamura Chemical Co., Ltd. (0.7 parts) was prepared. A lipophilic surfactant, Rheodol SP-L10 made by Kao Corporation (0.35 parts) and an oil-soluble initiator, α,α'-azobisisobutyronitrile (Kanto Chemical Co., Inc.) (0.183 parts) were dissolved in the mixture. The solution had a viscosity of 1 mPa·s at 25° C.

Gaseous nitrogen was blown from a bubbler (filter available from AZONE Corporation) into the resin solution to prepare a resin solution containing bubbles.

An aqueous surfactant, poly(vinyl alcohol) 500 (22.5 parts) made by Kanto Chemical Co., Inc. was dissolved in deionized water (450 parts) to obtain a solution, and the resin solution containing bubbles was poured into the above solution while the solution was being moderately stirred to prepare white dispersion [7].

White dispersion [7] was placed into a separable flask provided with a stirring device, a cooling water refluxing tube, and a nitrogen inlet tube, was stirred at room temperature for 20 minutes under a nitrogen stream, was heated to 70° C., was kept at 70° C. for 4 hours, was cooled to room temperature with stirring, and then was allowed to stand overnight.

The resulting particles were washed by suction filtration and with deionized water, were spread over a pad, and then were dried at 40° C. to prepare white powder [7]. White powder [7] was observed as in Example (1). Spherical particles not having internal cavities and having a particle size of about 5 to 100 μm were observed.

Table 1 summarizes the details of Examples (1) to (5) and Comparative Examples (1) and (2).

TABLE 1

| | RESIN SOLUTION | | | | | |
|---|---|---|---|---|---|---|
| | | FIRST DISPERSION MEDIUM | | | | SECOND |
| | RESIN | ORGANIC SOLVENT | *2 | LIPOPHILIC SURFACTANT | VISCOSITY (mPa·s) | DISPERSION MEDIUM |
| EXAMPLE (1) | POLYSTYRENE | TOLUENE | — | SP-L10 | 1056 | DEIONIZED WATER |
| EXAMPLE (2) | CYCLOOLEFIN POLYMER | TOLUENE | — | F606 | 960 | DEIONIZED WATER |
| EXAMPLE (3) | POLYSTYRENE | — | STYRENE MONOMER | SP-L10 | 936 | DEIONIZED WATER |
| EXAMPLE (4) | POLYSTYRENE | — | *3 | SP-L10 | 948 | DEIONIZED WATER |
| EXAMPLE (5) | *1 | — | STYRENE MONOMER | SP-L10 | 920 | DEIONIZED WATER |
| COMPARATIVE EXAMPLE (1) | — | — | STYRENE MONOMER | SP-L10 | 1 | DEIONIZED WATER |
| COMPARATIVE EXAMPLE (2) | — | — | *3 | SP-L10 | 1 | DEIONIZED WATER |

| | AQUEOUS SURFACTANT | DIVISION STEP | METHOD OF SOLIDIFICATION | REMARKS |
|---|---|---|---|---|
| EXAMPLE (1) | PVA | NOT EMPLOYED | STEAM DISTILLATION | INVENTIVE |
| EXAMPLE (2) | SODIUM LAURYL SULFATE | NOT EMPLOYED | REDUCED PRESSURE DISTILLATION | INVENTIVE |
| EXAMPLE (3) | PVA | NOT EMPLOYED | POLYMERIZATION | INVENTIVE |
| EXAMPLE (4) | PVA | EMPLOYED | POLYMERIZATION | INVENTIVE |
| EXAMPLE (5) | PVA | NOT EMPLOYED | POLYMERIZATION | INVENTIVE |
| COMPARATIVE EXAMPLE (1) | PVA | NOT EMPLOYED | POLYMERIZATION | COMPARATIVE |
| COMPARATIVE EXAMPLE (2) | PVA | NOT EMPLOYED | POLYMERIZATION | COMPARATIVE |

*1: POLYMER PREPARED BY PARTIAL POLYMERIZATION OF STYRENE MONOMER
*2: POLYMERIZABLE MONOMER
*3: STYRENE MONOMER AND NEOPENTYL GLYCOL DIMETACRYLATE

The entire disclosure of Japanese Patent Application No. 2015-008486 filed on Jan. 20, 2015 including description, claims, drawings, and abstract are incorporated herein by reference in its entirety.

What is claimed is:

1. A method of producing, in a liquid, a hollow particulate material having a cavity therein, the method comprising:
   (A) forming gas bubbles in a resin solution containing a resin, a first dispersion medium, and a lipophilic surfactant by blowing gas into the resin solution with a bubbler;
   (B) pouring the resin solution having the gas bubbles into a second dispersion medium to form liquid droplets of the resin and the first dispersion medium encapsulating the gas bubbles and prepare a dispersion of the liquid droplets; and
   (C) solidifying the liquid droplets formed in step (B) and isolating the solidified liquid droplets from the second dispersion medium to produce a hollow particle material having a cavity therein.

2. The method according to claim 1, wherein the first dispersion medium includes an organic solvent or a polymerizable monomer.

3. The method according to claim 1, wherein the second dispersion medium includes an aqueous solvent.

4. The method according to claim 1, wherein the dispersion of the liquid droplets contains an aqueous surfactant.

5. The method according to claim 1, wherein the resin solution has a viscosity of 10 mPa·s or more at 25° C.

6. The method according to claim 1, wherein the liquid droplets are solidified through removal of the first dispersion medium.

7. The method according to claim 1, wherein the liquid droplets are solidified through polymerization of the liquid droplets.

8. The method according to claim 1 further comprising, between steps (B) and (C), a step of dividing the liquid droplets encapsulating the gas.

9. The method according to claim 1, wherein the gas in the step (A) is air or inert gas.

* * * * *